US012652291B2

(12) United States Patent
Li

(10) Patent No.: US 12,652,291 B2
(45) Date of Patent: Jun. 9, 2026

(54) DETECTING DATA TRAFFIC ANOMALIES IN INTERNET OF THINGS (IOT) DEVICES WITH UNSUPERVISED ISOLATION FOREST (IFOREST) MODEL

(71) Applicant: Fortinet, Inc., Sunnyvale, CA (US)

(72) Inventor: Haitao Li, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 170 days.

(21) Appl. No.: 18/217,488

(22) Filed: Jun. 30, 2023

(65) Prior Publication Data

US 2025/0007924 A1 Jan. 2, 2025

(51) Int. Cl.
  *H04L 29/06* (2006.01)
  *H04L 9/40* (2022.01)
(52) U.S. Cl.
  CPC ................................ *H04L 63/1416* (2013.01)
(58) Field of Classification Search
  CPC .................................................... H04L 63/1416
  USPC ............................................................ 726/23
  See application file for complete search history.

(56) References Cited

U.S. PATENT DOCUMENTS

2019/0020530 A1* 1/2019 Au ......................... H04W 72/21
2021/0248611 A1* 8/2021 Matyska ................ G06Q 10/10
2021/0266293 A1* 8/2021 Liu ...................... H04L 61/5007

OTHER PUBLICATIONS

Eskandari, "Passban IDS: An Intelligent Anomaly-Based Intrusion Detection System for IoT Edge Devices", Aug. 2020, IEEE, pp. 6882-6895 (Year: 2020).*
Eskandari, "Passban IDS: An intelligent anomaly-based intrusion detection system for IoT edge devices", 2020, IEEE, pp. 1-24 (Year: 2020).*

* cited by examiner

*Primary Examiner* — Taghi T Arani
*Assistant Examiner* — Gregrory A Lane
(74) *Attorney, Agent, or Firm* — Law Office of Dorian Cartwright; Dorian Cartwright

(57) ABSTRACT

Data traffic statistics are generated for each IoT device over a training sliding window. Feature vectors and frequency can be extracted from the data traffic statistics over the training sliding window. A plurality of iTrees of an iForest. New data traffic is received for the specific IoT device. New features are continuously extracting new feature vectors from the new data traffic of the IoT device over a detection sliding window. An instance anomaly score can then be calculated for each instance of a specific IoT device by passing the new feature vectors for the IoT device through each iTree of the iForest for the specific IoT device. Each instance represents a data packet or other segment. An anomaly score is updated over the detection sliding window with the instance anomaly score. Anomaly is detected in a specific instance of the specific IoT device responsive to the anomaly score exceeding a predetermined threshold. In response, a security action can be taken.

3 Claims, 6 Drawing Sheets

Figure 2:
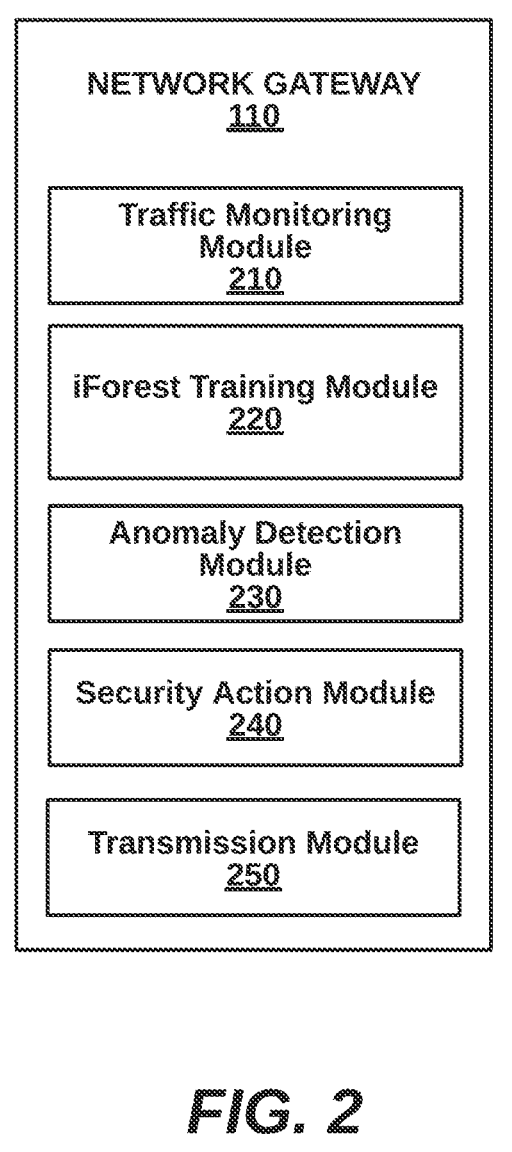

NETWORK GATEWAY
110

Traffic Monitoring
Module
210 iForest Training Module
220

Anomaly Detection
Module
230

Security Action Module
240

Transmission Module
250

DETECTING DATA TRAFFIC ANOMALIES IN INTERNET OF THINGS (IOT) DEVICES WITH UNSUPERVISED ISOLATION FOREST (IFOREST) MODEL

FIELD OF THE INVENTION

The invention relates generally to computer networks, and more specifically, to using an unsupervised Isolation Forest (iForest) model to detect data traffic anomalies in Internet of Things (IoT) devices.

BACKGROUND

With the increased use of IoT infrastructure in every domain, threats and attacks in these infrastructures are also growing commensurately. IoT devices are particularly vulnerable to network attacks such as data thefts, phishing attacks, spoofing and denial of service attacks (DDOS attacks). For example, the traffic volume of IoT-based DDOS attacks reaches unprecedented levels. Mirai botnet was used, alongside BASHLITE in the IoT-based DDOS attack on 20 Sep. 2016 on the Krebs on Security site which reached 620 Gbit/s. The attacks usually lead to unusual patterns in traffic data that do not conform to expected normal behavior. The need for timely detection of IoT traffic anomaly has become imperative for mitigating the risks associated with these attacks.

What is needed is a robust technique for detecting data traffic anomalies in IoT devices with an unsupervised iForest model.

SUMMARY

To meet the above-described needs, methods, computer program products, and systems for detecting data traffic anomalies in IoT devices with an unsupervised iForest model.

In one embodiment, data traffic statistics are generated for each IoT device over a training sliding window. Feature vectors and frequency can be extracted from the data traffic statistics over the training sliding window. A plurality of iTrees of an iForest are built for each IoT device using the feature vectors.

In another embodiment, during real-time monitoring, new data traffic is received for the specific IoT device. New features are continuously extracting new feature vectors from the new data traffic of the IoT device over a detection sliding window. An instance anomaly score can then be calculated for each instance of a specific IoT device by passing the new feature vectors for the IoT device through each iTree of the iForest for the specific IoT device. Each instance represents a data packet or other segment.

In still another embodiment, an anomaly score is updated over the detection sliding window with the instance anomaly score. Anomaly is detected in a specific instance of the specific IoT device responsive to the anomaly score exceeding a predetermined threshold. In response, a security action can be taken.

Advantageously, computer networking is improved with more secure and efficient network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a gateway device of the system of FIG. 1, according to one embodiment.

DETAILED DESCRIPTION

Methods, computer program products, and systems for detecting data traffic anomalies in IoT devices with an unsupervised iForest model. One of ordinary skill in the art will recognize many alternative embodiments that are not explicitly listed based on the following disclosure.

I. Network Systems for iForest Anomaly Detection (FIGS. 1-2)

Figure 1:
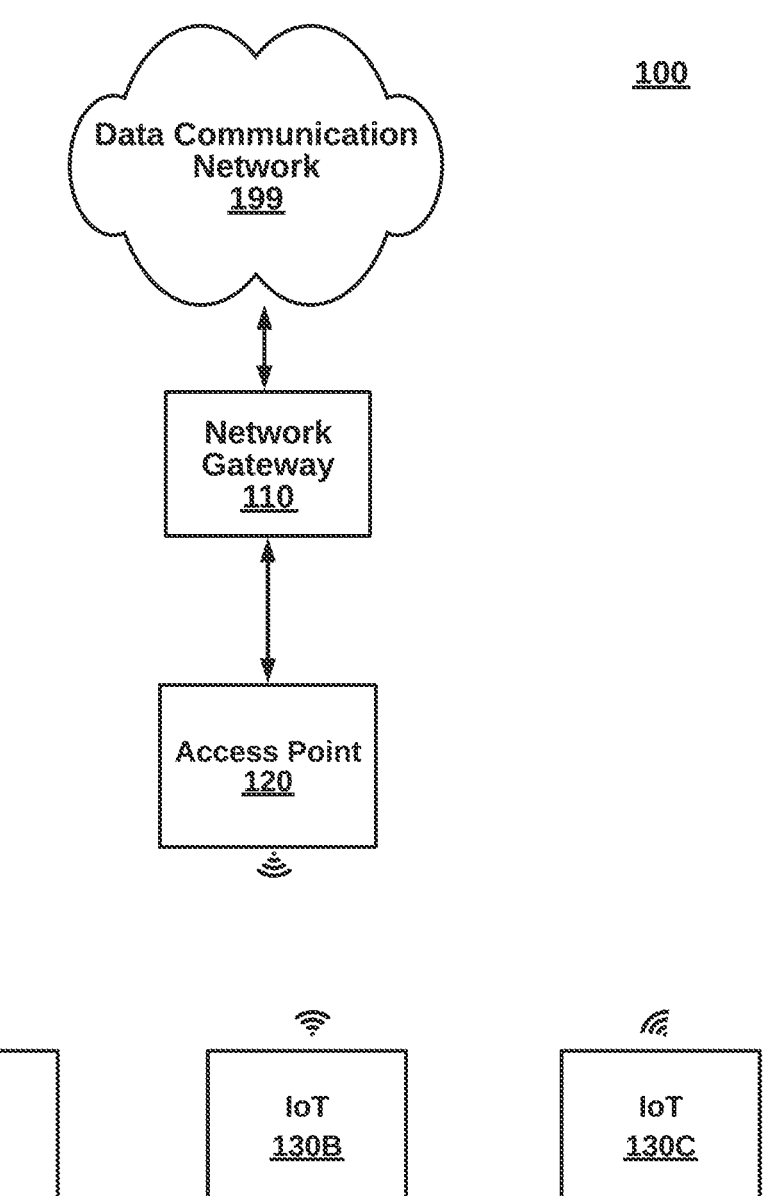
FIG. 1 is a high-level block diagram illustrating a network system for detecting data traffic anomalies in of IoT devices with an unsupervised iForest model, according to one embodiment.

FIG. 1 is a high-level block diagram illustrating a network system 100 for detecting data traffic anomalies in IoT devices with an unsupervised iForest model, according to one embodiment. The network system 100 includes a network gateway 110, an access point 120 and IoT devices 130A-C. Other embodiments of the system 100 can include additional components that are not shown in FIG. 1, such as controllers, network gateways, routers, switches, access points, and additional gateways and IoT devices. Many variations are possible. The components are implemented in hardware, software, or a combination of both, as shown in the example below of FIG. 6.

The network gateway 110 can be coupled to a data communication network 199 such as a private network connected to the Internet. The access point 120 can be connected to the data communication system both via hard wire (e.g., Ethernet) and via wireless networking, and serve as a bridge for access back and forth. The IoT devices 130A-C can be wirelessly or wire connected to the access point 120. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

The network gateway 110, while processing inbound and outbound network traffic, detects IoT traffic having feature vectors that exceed an anomaly threshold. The features can include count, size and frequency (mean and/or variance) over a sliding window. The network gateway 110 builds iTrees from the extracted feature vectors. A baseline or average evolves using data from good traffic.

During real-time detection of network anomalies, an instance anomaly score (e.g., a single data packet) can be calculated by passing new feature vectors from real-time traffic through the iTrees. An anomaly score is determined over a sliding window of time of instance anomaly scores. A security action can be taken responsive to detecting an anomaly.

The network gateway 110 in other operations may run firewalls, network management and configuration, access point management, and station tracking, for example.

The IoT devices 120A-C can be a small or mini computer device, a physical appliance with a network interface added (e.g., refrigerator or car), a smart wearable technology (e.g., fitness tracker or earbud), or even a standard computing device. In some embodiments, a user is mobile so an IoT device moves around the enterprise network connecting to different access points. IoT is a catch all term for a growing number of electronics that are not traditional computing devices, but are connected to the Internet to send data, receive instructions or both.

FIG. 2 is a more detailed block diagram illustrating the network gateway 110 of FIG. 1, according to an embodiment. The network gateway 110 includes a traffic monitoring module 210, an iForest training module 220, an anomaly detection module 230, a security action module 240 and a transmission module 250. Components can be implemented in software and/or software. Many other variations of components are possible.

The iForest training module 220 further comprises a vector extraction module 212 and an iTree builder module 214. The traffic monitoring module 210 generates data traffic statistics for each IoT device over a training sliding window. Then new data traffic is received for the specific IoT device. The vector extraction module 212 extracts feature vectors and frequency from the data traffic statistics over the training sliding window. New feature vectors are continuously extracted for the new data traffic of the IoT device over a detection sliding window. Network traffic is transformed into feature vectors by damped incremental statistics. The iTree builder module 230 builds a plurality of iTrees of an iForest for each IoT device using the feature vectors.

The anomaly detection module 230 further comprises a vector extraction module 224 and an iTree builder module 226. The vector extraction module 224 uses a window for extracting packet count, mean and variance of packet size, mean and variance of interval of packet arriving time. Inbound extraction can be independent of outbound extraction. The statistics will be grouped by the packet's sender in general (i.e., host) and traffic between the packet's sender and receiver (i.e., channel). Therefore, a total of 20 features can be extracted from a single time window (5 features, by host and by channel). The features are computed based on Damped Incremental Statistics.

The mean, variance of S can be calculated from IS:

$$\mu_S = \frac{LS}{N}, \sigma_S^2 = \left| \frac{SS}{N} - \left(\frac{LS}{N}\right)^2 \right|$$

Let S={$x_1$, $x_2$, . . . . $x_N$} be an unbounded data stream where $x_i \in$ R. For example, S can be a sequence of observed packet sizes. Define the tuple IS: =(N, LS, SS)

where N, LS, and SS are the number, linear sum, and squared sum of S. The mean, variance of S can be calculated from IS:

The sliding window allows extraction of current behavior and the weight of older values are exponentially decreased over time. One example decay function is:

$$d_\omega(t) := 2^{-\omega t}$$

Where ω>0 is the decay factor, and t is the time elapsed since the last observation. To update IS with $x_{cur}$ at time $t_{cur}$, Algorithm 1 is performed. The parameter ω can be regarded as time window. Larger ω corresponds to shorter time window.

The algorithm for updating IS upon inserting a new value is:

$$d = d_\omega(t_{cur} - t_{last})$$

$$IS = (d * N, d * LS, d * SS, t_{cur})$$

$$IS = \left(N + 1, LS + x_{cur}, SS + x_{cur}^2, t_{cur}\right)$$

One advantage of iForest is that anomalous data points are easier to separate from the rest of the sample. In order to isolate, the algorithm recursively generates partitions on the sample by randomly selecting an attribute and then randomly selecting a split value between the minimum and maximum values allowed for that attribute. Recursive partitioning can be represented by a tree structure, or iTree. While the number of partitions required to isolate a point can be interpreted as the length of the path, within the tree, to reach a terminating node starting from the root. In order to build an iTree, the algorithm recursively divides X' by randomly selecting an attribute q and a split value p until either the node has only one instance or all data at the node have the same values. The iForest algorithm has a linear time complexity with a low constant and a low memory requirement, which works well with high-volume data. iForest performs well even when the training set does not contain any anomalous point. Each IForest model is trained and maintained separately for each IoT device.

An anomaly score module 240 calculates an instance anomaly score for each instance of a specific IoT device by passing the new feature vectors for the IoT device through each iTree of the iForest for the specific IoT device. Each instance represents a data packet. The anomaly score is updated over the detection sliding window with the instance anomaly score. An anomaly is detected in a specific instance of the specific IoT device responsive to the anomaly score exceeding a predetermined threshold. In one embodiment, an instance anomaly score is calculated by applying the iForest model to feature vectors extracted from continuously observed packets, to mark each instance as benign or anomalous. Then, a majority vote on a sequence of marked instances is used to decide whether the entire stream is benign or anomalous.

A security action module 240 takes security action responsive to detecting anomalies. For example, a data packet, and other data packets of a malicious actor or a malicious session can be completely blocked. In another example, malicious data packets are quarantined or ignored.

The transmission module 250 then transmits data packets to IoT devices 130A-C and other wireless clients. One hardware embodiment includes Wi-Fi transceivers that signal across a wireless channel. Hardware adjustments are made to turn in specific bandwidth and spectrum.

II. Methods for iForest Anomaly Detection (FIGS. 3-5)

Figure 3:
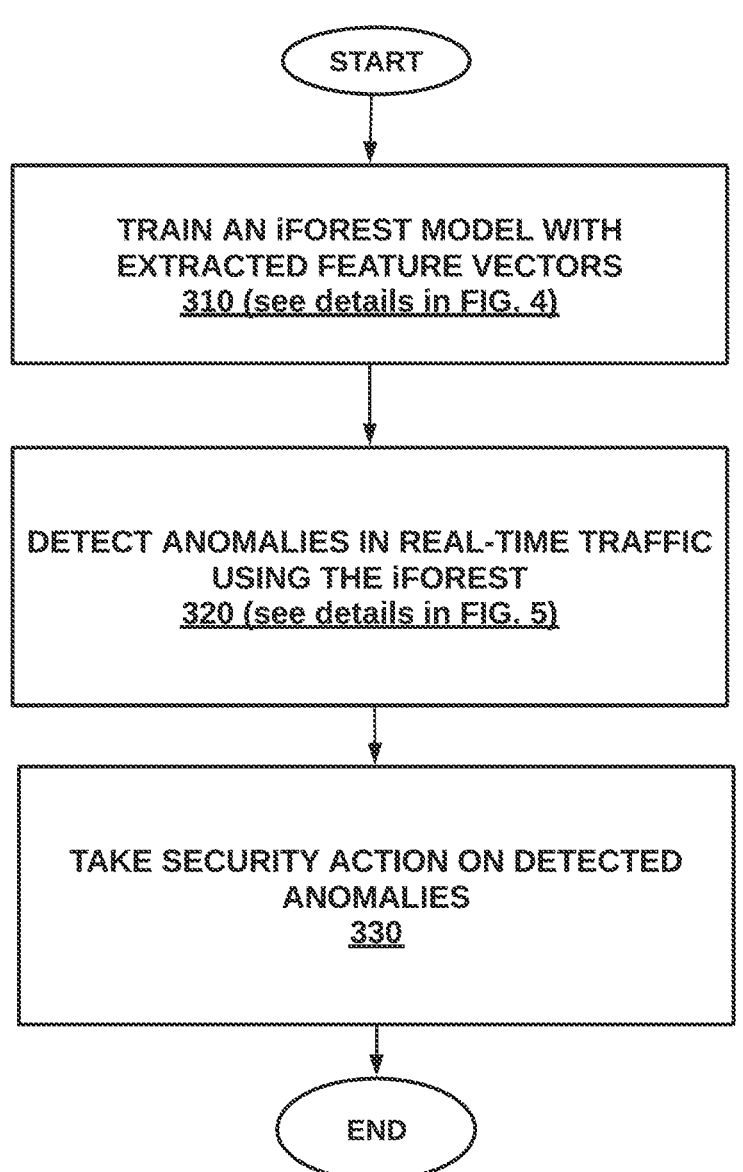
FIG. 3 is a high-level flow chart for network security for IoT devices with an unsupervised iForest model, according to an embodiment.

FIG. 3 is a high-level flow diagram illustrating a method 300 for network security for IoT devices with an unsupervised iForest model. The method 300 can be implemented by, for example, system 100 of FIG. 1.

Figure 4:
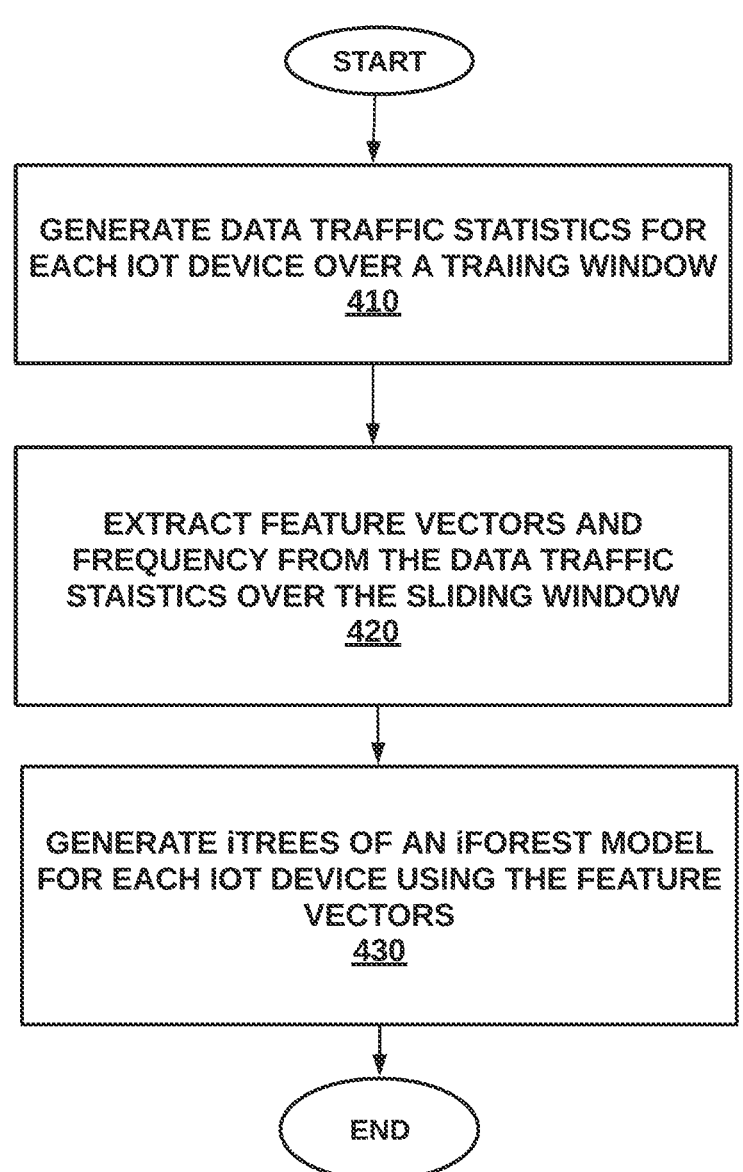
FIG. 4 is a more detailed flow chart for a step of iForest training, from the method of FIG. 3, according to one embodiment.
Figure 5:
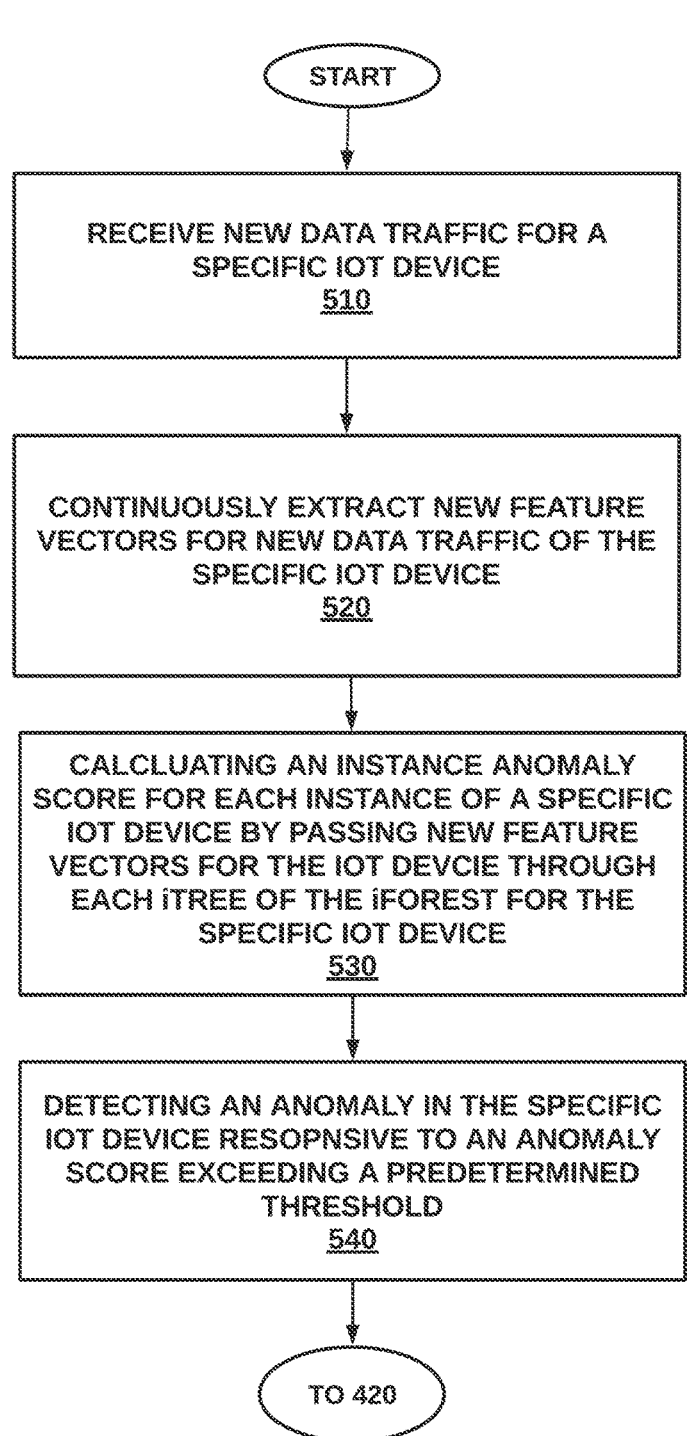
FIG. 5 is a more detailed flow chart for a step of real-time detection using iForest, from the method of FIG. 3, according to one embodiment.

At step 310, an iForest model is trained, as described more fully in FIG. 4. At step 320, anomalies are detected in real-time traffic with the iForest, as described more fully in FIG. 5. Finally, at step 330, a security action can be taken responsive to detecting the anomaly.

A more detailed example of step 320 for training the iForest model, is shown in FIG. 4, according to one embodiment. At step 410, data traffic statistics are generated for each IoT device over a training sliding window. At step 420, feature vectors and frequency are extracted from the data traffic statistics over the training sliding window. At step 430, a plurality of iTrees of an iForest are generated for each IoT device using the feature vectors.

A more detailed example of step 320 for detecting anomalies in real-time with iForest model, is shown in FIG. 5, according to one embodiment. At step 510, new data traffic is received for the specific IoT device. At step 520, new feature vectors are continuously extracted for the new data traffic of the specific IoT device over a detection sliding window. At step 530, an instance anomaly score is calculated and updated for each instance of a specific IoT device by passing the new feature vectors for the IoT device through each iTree of the iForest for the specific IoT device. Each instance represents a data packet. At step 540, an anomaly is detected in a specific instance of the specific IoT device responsive to the anomaly score exceeding a predetermined threshold.

III. Computing Device for iForest Anomaly Detection (FIG. 6)

Figure 6:
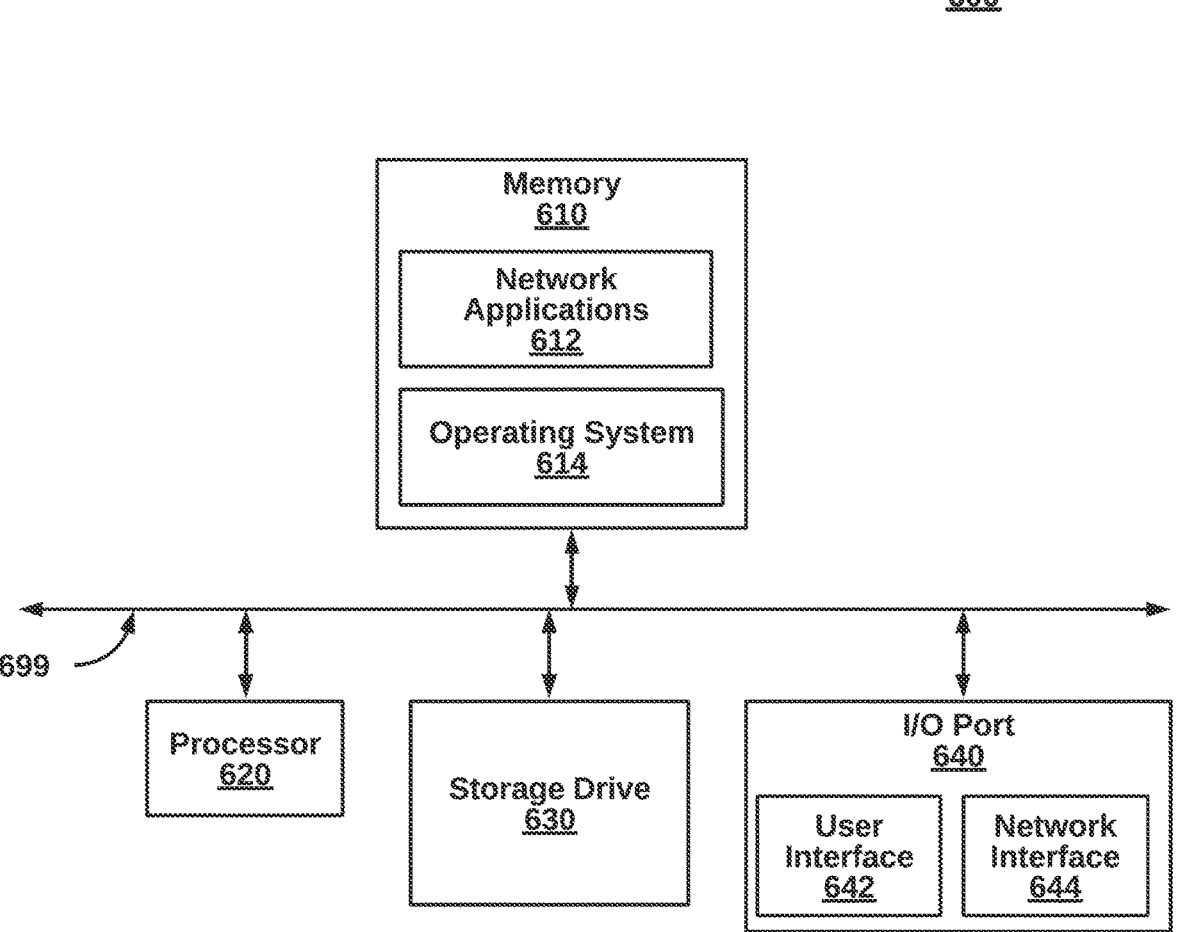
FIG. 6 is a block diagram illustrating an example computing device implementing the network system of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the network gateway 110, the access point 120 and the IoT devices 130A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method, in a gateway device, for detecting data traffic anomalies in a plurality of Internet of Things (IoT) devices an unsupervised Isolation Forest (iForest) model, the method comprising the steps of:

generating data traffic statistics for each IOT device over a training sliding window;

extracting feature vectors and frequency from the data traffic statistics over the training sliding window;

building a plurality of iTrees of an iForest for each IoT device using the feature vectors;

receiving new data traffic for the specific IoT device;

continuously extracting new feature vectors for the new data traffic of the IOT device over a detection sliding window;

calculating an instance anomaly score for each instance of a specific IoT device by passing the new feature vectors for the IOT device through each iTree of the iForest for the specific IoT device, wherein each instance represents a data packet;

updating an anomaly score over the detection sliding window with the instance anomaly score;

detecting anomaly in a specific instance of the specific IoT device responsive to the anomaly score exceeding a predetermined threshold; and taking security action.

2. A non-transitory computer-readable medium storing computer-readable instructions in a gateway device on a data communication network, that when executed by a processor, perform a method for detecting data traffic anomalies in a plurality of Internet of Things (IoT) devices an unsupervised Isolation Forest (iForest) model, the method comprising:

generating data traffic statistics for each IOT device over a training sliding window;

extracting feature vectors and frequency from the data traffic statistics over the training sliding window;

building a plurality of iTrees of an iForest for each IoT device using the feature vectors;

receiving new data traffic for the specific IoT device;

continuously extracting new feature vectors for the new data traffic of the IOT device over a detection sliding window;

calculating an instance anomaly score for each instance of a specific IoT device by passing the new feature vectors for the IoT device through each iTree of the iForest for the specific IoT device, wherein each instance represents a data packet;

updating an anomaly score over the detection sliding window with the instance anomaly score;

detecting anomaly in a specific instance of the specific IoT device responsive to the anomaly score exceeding a predetermined threshold; and taking security action.

3. A gateway device on a data communication network for detecting data traffic anomalies in a plurality of Internet of Things (IoT) devices an unsupervised Isolation Forest (iForest) model, the gateway device comprising:

a processor;

a network communication module, communicatively coupled to the processor and to the data communication network; and a memory, communicatively coupled to the processor and storing computer code executed by the processor, comprising:

an iForest training module to generate data traffic statistics for each IoT device over a training sliding window, wherein the iForest training module extracts feature vectors and frequency from the data traffic statistics over the training sliding window, and wherein the iForest training module builds a plurality of iTrees of an iForest for each IoT device using the feature vectors;

an anomaly detection module to receive new data traffic for the specific IoT device, wherein the anomaly detection module continuously extracts new feature vectors for the new data traffic of the IoT device over a detection sliding window, wherein the anomaly detection module calculates an instance anomaly score for each instance of a specific IoT device by passing the new feature vectors for the IoT device through each iTree of the iForest for the specific IoT device, wherein each instance represents a data packet, and wherein the anomaly detection module updates an anomaly score over the detection sliding window with the instance anomaly score, wherein the anomaly detection module detects anomaly in a specific instance of the specific IoT device responsive to the anomaly score exceeding a predetermined threshold; and a security module to take a security action.

* * * * *